Patented May 1, 1945

2,374,759

UNITED STATES PATENT OFFICE 2,374,759

PLASTICIZED RUBBER HYDROCHLORIDE SHEET

Theodore Rudolph Latour, Kenmore, N. Y., assignor to E. I. du Pont de Nemours & Company, Wilmington, Del., a corporation of Delaware No Drawing. Application March 29, 1941, Serial No. 385,870

3 Claims. (Cl. 260—735)

This invention relates to rubber hydrohalides, especially rubber hydrochloride. More particularly it appertains to thin sheets of rubber hydrochloride which are tough, durable and tear resistant.

Rubber, a polymer-like material composed of units and having the formula:

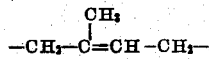

readily adds hydrogen chloride to form a product called "rubber hydrochloride," having the structural unit:

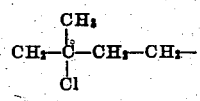

as indicated in J. I. E. C. XXVI page 125, Paper Trade Journal for February 23, 1939, page 96, and the literature cited therein. Glass-clear films may be cast from suitable solutions of rubber hydrochloride, provided the solvent is evaporated under controlled conditions.

Sheet material comprising unmodified rubber hydrochloride is of little or no commercial value, since it is deficient in flexibility, toughness, durability and tear resistance, and deteriorates rapidly upon aging, particularly when it is exposed to light and subjected to elevated temperatures. Much has been done to enable rubber hydrochloride to compete with other types of transparent sheet material.

It was an object of this invention to provide rubber hydrochloride sheet wrapping materials which were not brittle and/or fragile. A further object was to provide a method of rendering rubber hydrohalide sheets tough, durable and tear resistant. A general advance in the art, and other objects which will appear hereinafter, are also contemplated.

It has now been found that the utility of rubber hydrochloride sheeting can be greatly increased by plasticizing it with dibutyl sebacate.

How the foregoing objects and related ends are accomplished will be apparent from the following exposition, in which are disclosed the principle and divers embodiments of the invention, including the best mode contemplated for carrying out the same. The parts are given by weight throughout the application.

Prepare rubber hydrochloride by adding dry hydrogen chloride to 15 minute milled pale crepe rubber in chloroform (a 5% solution). Precipitate the product with methanol and wash with methanol.

Dissolve such a product containing 30.5% chlorine, in trichlorethylene to give a 6% solution. Separate the solution into portions, and add the per cent (based on the weight of the rubber hydrochloride) of the plasticizers tabulated below:

1. 10% dibutyl sebacate
2. 7.5% dibutyl azelate
3. 10% amyl hexyl adipate
4. 10% dilauryl adipate
5. 10% butyl amyl azelate
6. 8% oleyl lauryl adipate
7. 10% diamyl sebacate
8. 10% didecyl sebacate
9. 10% dioleyl sebacate
10. 10% distearyl sebacate.

Cast films from the resulting clear solutions on a chromium plated steel plate and dry at about 40° C.

The dibutyl sebacate plasticized film was, after stripping from the plate, 0.00099 of an inch thick, and was flexible, transparent and strong. It was more durable and more transparent than the corresponding unplasticized rubber hydrochloride sheeting and exhibited tear resistance superior to that obtained with conventional rubber hydrochloride plasticizers.

The dibutyl azelate dissolved readily in the rubber hydrochloride solution. The film produced therefrom was transparent, highly flexible, strong and tough, indicating that the solution was suitable for the preparation of coherent, self-supporting sheet wrapping material.

The amyl hexyl adipate also dissolved readily in the rubber hydrochloride solution. The physical properties of the cast film showed that this material was also especially suitable for the preparation of transparent films and coatings where flexibility and durability are requisite. The physical characteristics of the sheet material as described above are summarized in the following table.

Table

| Plasticizer | Thickness | Tear | Tumble 75° F. (24° C.) 35% rel. hum. | Tumble 0°) F.(−18° C. 7% rel. hum. |
|---|---|---|---|---|
| Control (no plasticizer) | 0.00106 | 11.7 | 68 | 9 |
| Dibutyl sebacate | 0.00099 | 70.0 | 1,742 | 600 |
| Dibutyl azelate | 0.00103 | 18.2 | 536 | 27 |
| Amyl hexyl adipate | 0.00090 | 21.6 | 291 | 100 |

Results, superior to those obtained with heretofore known plasticizers, are also obtained with compounds having chemical structures homo-

are well known to the art, and need not be repeated here. The compositions of the present invention are especially suited for the preparation of thin (that is, on the order of a few ten-thousandths to a few hundredths of an inch in thickness) sheet material, particularly transparent, self-supporting films which are highly durable, tear resistant, and water resistant.

The tumbling test referred to in the table is the conventional test whereby the sheet material to be tested is made into a bag, filled with material such as dried beans, rice or the like, and dropped repeatedly until splitting of the bag results.

The toughness, durability and tear resistance of the sheet material produced according to this invention is so outstanding that such material is particularly suited for the manufacture of garments by sewing, wrapping parcels, and the like.

As many apparently widely different embodiments of this invention may be made without departing from the spirit and scope thereof, it is to be understood that this invention is not limited to the specific embodiments thereof except as defined in the appended claims.

I claim:

1. Sheet wrapping material comprising essentially rubber hydrochloride plasticized with a small amount of dibutyl sebacate.

2. Sheet wrapping material comprising essentially rubber hydrochloride of 26% to 34% chlorine content plasticized with 1% to 15% dibutyl sebacate.

3. Film about 0.001 of an inch thick consisting of 90% rubber hydrochloride of 28% to 32% chlorine content and 10% dibutyl sebacate.

THEODORE RUDOLPH LATOUR.